METHOD OF MAKING SEMICONDUCTORS BY LASER INDUCED DIFFUSION

Filed May 27, 1965

INVENTORS.
HORTON R. POTTS
CHARLES A. SPEICHER

BY Andrew Taras
AGENT

United States Patent Office 3,420,719
Patented Jan. 7, 1969

3,420,719

METHOD OF MAKING SEMICONDUCTORS BY LASER INDUCED DIFFUSION

Horton R. Potts, Endicott, and Charles A. Speicher, Endwell, N.Y., assignors to International Business Machines Corporation, Armonk, N.Y., a corporation of New York Filed May 27, 1965, Ser. No. 459,402
U.S. Cl. 148—188 6 Claims
Int. Cl. H01l 7/44

ABSTRACT OF THE DISCLOSURE

The invention concerns a diffusion process wherein a diffusant, in the form of a thin film, is applied by well-known techniques, for example evaporation, to a substrate constituted primarily of a semiconductor. The diffusant is diffused into the substrate by means of energy derived from a laser beam, the time of diffusion being under control of means subjected to a diverted component of the laser beam.

The invention relates to the fabrication of monolithic structures and, more particularly, to the diffusion of a substrate with a diffusant influenced by a high energy beam; for example, a laser beam.

In the fabrication of monolithic circuit structures whereon several active elements are formed on a single substrate, isolation between adjacent active elements by prior art methods has been obtained by establishing narrow regions of reverse-biased P-N junctions completely surrounding these active elements. In fabricating these narrow regions, problems have arisen. One is the lack of temperature control of the substrate and another is the compilcations that arise when repeated diffusion processes are employed causing unwanted structural changes in the substrate. These prior art methods of fabrications have resulted in very high reject rates, low production and high component costs.

One object of the present invention is therefore directed to an improvement in the process of providing isolating regions in substrates during the diffusion process without affecting the remaining regions of the substrate.

Another object resides in providing greater reliability to monolithic structures by establishing defined regions of isolation between adjacent active elements during the fabrication process.

The foregoing and other objects, features and advantages of the invention will be apparent from the following more particular description of preferred embodiments of the invention, as illustrated in the accompanying drawings.

Figure 1:
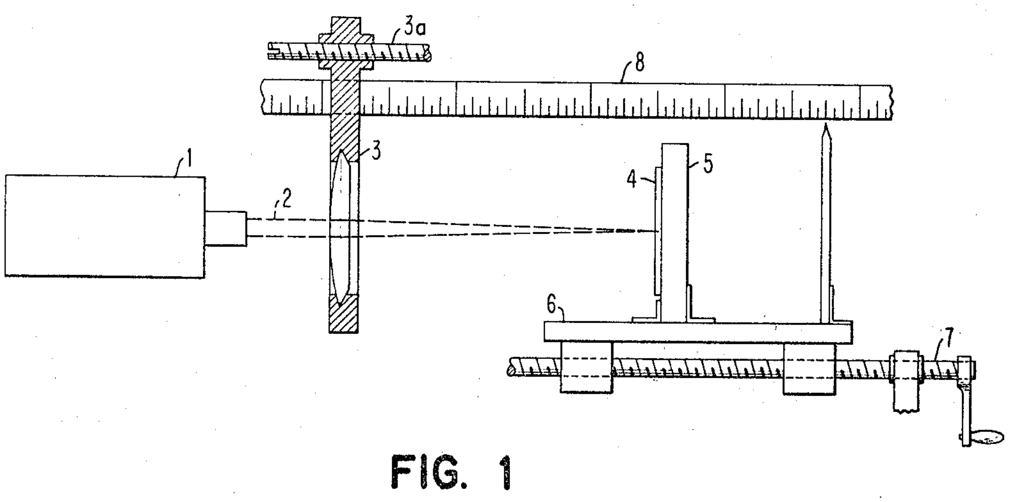
FIG. 1 is a mechanical arrangement using a focussed laser beam for carrying out the diffusion process.

Referring to FIG. 1, the process involves directing from a source 1 a continuous laser beam 2 through a lens system 3 onto the surface of the substrate 5 upon which has been evaporated a thin film of a diffusant material 4, having a thickness of from 1000 A. to 10,000 A. The output power of the laser beam is controlled such that the temperature at the point of focus on the surface of the substrate is that required to cause diffusion of the diffusant into the substrate. The various patterns of diffused regions may be produced by translating either the substrate which is mounted to a stage 6 positioned by suitable means 7, schematically shown, or by moving the laser beam means by suitable lens adjusting means 3a. These adjusting means also cooperate with calibrating means 8 to indicate lens to substrate distances. After the desired diffusion has taken place, the remaining diffusant may be removed by chemical etch techniques.

Any of the elemental or commonly used compound semiconductors; such as germanium, silicon, gallium arsenide, gallium phosphide, indium antimonide, etc., are suitable as substrates. All of the metallic dopants, aluminum, gallium, indium, zinc, etc., are suitable for use as diffusants.

In the operation of the invention, a temperature control is obtained by the use of the following expression:

$$T=3W/4\pi KJr_0$$

wherein

W=incident power in watts,
K=thermal conductivity,
J=joule conversion factor,
$r_0$=radius of the incident laser beam, and
T=temperature rise at the point of laser and focus in degrees C.

In this expression, the term "$3/4\pi J$" is a constant and has the value of 0.17. The thermal conductivity K may be derived from the annual Handbook of Chemistry and Physics, published by the Chemical Rubber Publishing Company, for all of the substrates. As an example, in the case of gallium arsenide, this K value is 0.37. The control parameters for the system are W and $r_0$, $r_0$ being determined by the focal length of the lens and the distance between the surface substrate and the lens. The diagram in FIG. 3 is presented to show different relationships between $r_0$ and the lens to substrate distances. Finally, the laser power W may be controlled by a monitor feedback system. A small fraction of the beam power KW, where $K<<1$, is monitored and fed back to the laser power supply, by means of the schematic arrangement shown in FIG. 2.

This arrangement comprises a laser source I which issues a continuous beam **2*ab*, a component 2*a* thereof representing a fractional portion of the beam power is reflected by means of a semi-transparent mirror 3 and transmitted to a photodiode 4 whose output is passed on to an amplifier 5 connected to suitable indicating means 6 which indicates the amplified output of the photodiode. This amplified output is passed on to a control means 7 which is connected to a laser power supply 8, controlling the laser source and, hence, the power of the beam 2*ab***.

A second but major component **2*b* of the beam 2*ab* passes through the mirror 3 and an adjustable lens system 10, which focusses the beam to the required diameter size. This focussed beam is directed upon a thermocouple 11, adjustable relative to the lens system. Distances separating the lens system and the thermocouple means are obtainable by suitable indicators 10*a* and 11*a*, cooperating with a measuring scale 12. The output of the thermocouple 11 is connected to suitable measuring means 13** which provides an indication in temperature of the beam power incident upon the thermocouple.

After the beam energy has been determined in the manner described, the thermocouple means 11 is removed from the path of the beam and the substrate is placed in the position previously occupied by the thermocouple.

Figure 4:
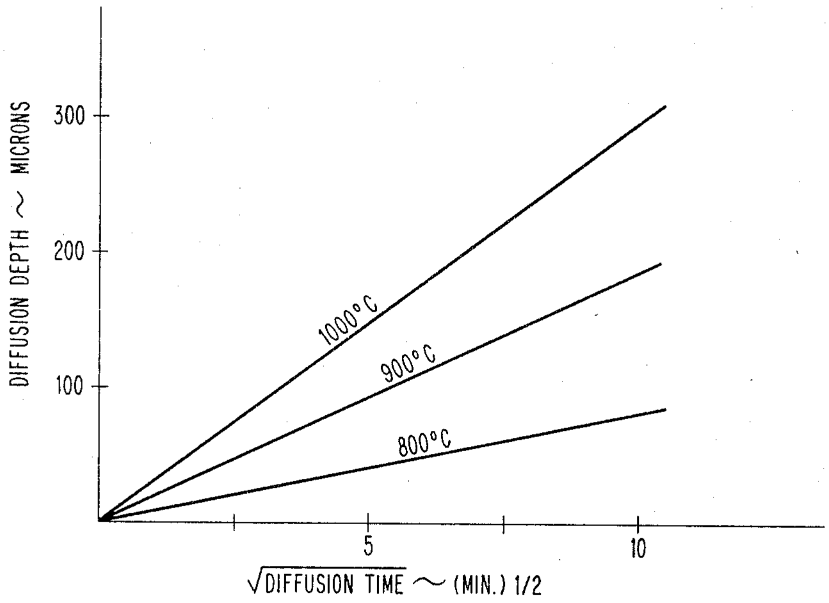
FIG. 4 is a diagram showing the relationships between temperature diffusion time and diffusion depth.

During the diffusion process, the depth to which the diffusant penetrates the substrate is carried out under controlled conditions of temperature and time. From an inspection of the diagram in FIG. 4, the depth of penetration in relation to diffusion time and temperature of the focussed beam may be determined, for example, for a substrate, gallium arsenide utilizing zinc as the diffusant. The diffusion depth is stated in terms of microns, diffusion time in terms of minutes and the temperature in degrees Centigrade.

Figure 2:
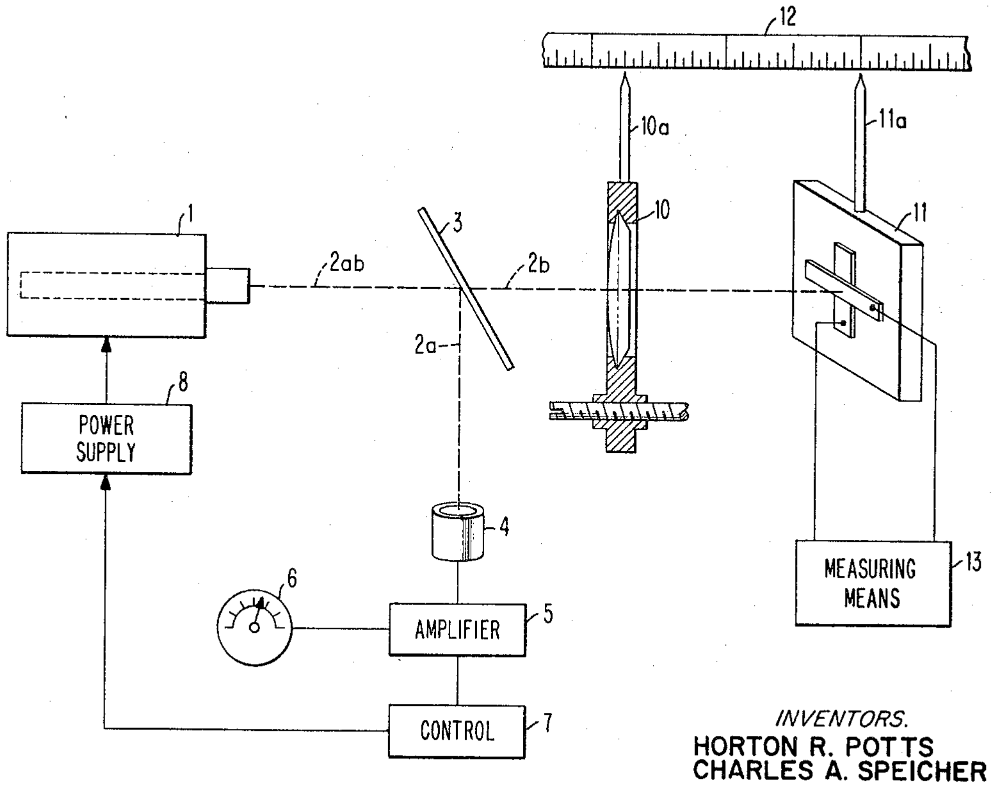
FIG. 2 is an arrangement for monitoring and controlling the energy of the laser beam.
Figure 3:
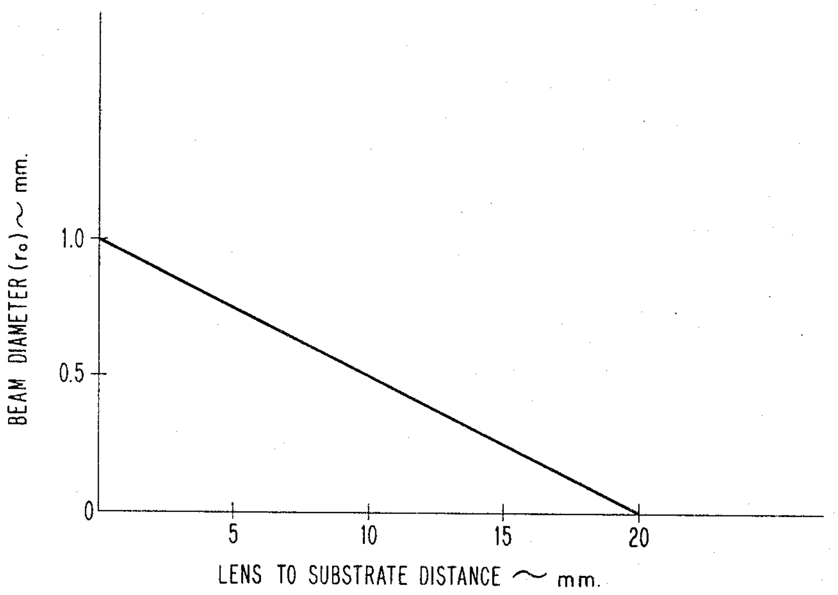
FIG. 3 is a diagram showing the dependence of laser beam radius on lens to substrate spacing.

In controlling the temperature by means of the arrangement of FIG. 2, consideration is given to factors such as the reflectivity of the diffusant-substrate surface, which is a function of the surface smoothness, and the absorption characteristics of the diffusant as well as the absorption properties of the substrate. These factors accordingly determine the type and nature of the thermocouple used to measure the energy of the beam. As an example, one type of thermocouple that may be employed is one having intersecting film strips of copper and nickel supported on a substrate having the characteristics similar to the diffusant-substrate processed by the present invention.

The process provides four different methods of producing a desired pattern of diffusion into the substrate:

(a) Sample patterns may be obtained by focussing the beam through a suitable lens; for example, a circular diffused spot could be obtained from a circular lens or a diffused line from a cylindrical lens.

(b) Patterns may be obtained by slowly moving the substrate such that the focussed beam traces out the pattern desired. The motion is at such a rate that diffusion is completed as the beam progresses.

(c) Patterns may be obtained by rapidly moving the substrate such that the focussed beam traces out the pattern desired. The motion is at such a rate that the beam retraces the complete pattern prior to the cooling of any particular point, resulting in the entire pattern being diffused substantially simultaneously.

(d) Patterns may be obtained by defocussing the beam to a large diameter, placing a mask containing the desired pattern in the diffused region of the beam, and refocussing the defocussed beam by means of a lens system intermediate the mask and the substrate.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A diffusion process for substrates comprising the steps of:
evaporating a diffusant film upon a substrate surface,
subjecting the diffusant-substrate surface to the energy of a laser beam of sufficient intensity to cause diffusion, and
diverting a component of said beam and employing the diverted component to control the energy and time of diffusion of said beam upon the diffusant-substrate surface.

2. A diffusion process for substrates comprising the steps of:
evaporating a diffusant film upon a substrate surface,
subjecting discrete areas of the diffusant-substrate surface to the energy of a laser beam of sufficient intensity to cause diffusion, and
diverting a component of said beam and employing the diverted component to control the energy and time of diffusion of said beam upon the discrete areas of said diffusant-substrate surface.

3. A diffusion process for substrates overlayed with a diffusant comprising the steps of:
diverging the energy of a laser beam,
passing the divergent beam energy through a mask,
converging the beam energy passing from said mask to an intensity sufficient to cause diffusion, and
directing the converging beam energy on to the surface of the diffusant-substrate.

4. A diffusion process for substrates overlayed with a diffusant comprising the steps of:
diverging the energy of a laser beam,
passing the divergent beam energy through a mask,
converging the beam energy passing from said mask to an intensity sufficient to cause diffusion, and
directing the converged beam energy on to discrete portions of the surface of the diffusant-substrate.

5. A diffusion process for substrates overlayed with a diffusant comprising the steps of:
diverging the energy of a laser beam,
passing the divergent beam energy through a mask,
converging the beam energy passing from said mask to an intensity sufficient to cause diffusion,
diverting a portion of the converged beam,
measuring the energy of the diverted portion, and
controlling the time that the converged beam is directed upon the surface of the diffusant-substrate as a function of the measured energy of the diverted portion.

6. A diffusion process for semiconductors overlayed with a diffusant consisting of metallic dopants comprising the steps of:
diverging the energy of a laser beam,
passing the divergent beam energy through a mask,
converging the beam energy passing from said mask to an intensity sufficient to cause diffusion,
diverting a portion of the converged beam,
measuring the energy of the diverted portion, and
controlling the time that the converged beam is directed upon the surface of the metallic doped diffusant-semiconductor as a function of the measured energy of the diverted portion.

References Cited

UNITED STATES PATENTS

| | | | |
|---|---|---|---|
| 2,793,282 | 5/1957 | Steigerwald | 148—1.5 |
| 2,929,006 | 3/1960 | Hertet | 148—188 |
| 3,108,915 | 10/1963 | Ligenza | 148—187 |

HYLAND BIZOT, *Primary Examiner.*

U.S. Cl. X.R.

148—186